US012456516B2

(12) United States Patent
Xu et al.

(10) Patent No.: US 12,456,516 B2
(45) Date of Patent: Oct. 28, 2025

(54) METHOD FOR OPERATING MEMORY CELL AND RESISTIVE RANDOM ACCESS MEMORY, AND ELECTRONIC DEVICE

(71) Applicant: Institute of Microelectronics, Chinese Academy of Sciences, Beijing (CN)

(72) Inventors: Xiaoxin Xu, Beijing (CN); Jie Yu, Beijing (CN); Danian Dong, Beijing (CN); Zhaoan Yu, Beijing (CN); Hangbing Lv, Beijing (CN)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 378 days.

(21) Appl. No.: 18/029,198

(22) PCT Filed: Jan. 25, 2021

(86) PCT No.: PCT/CN2021/073534
§ 371 (c)(1),
(2) Date: Sep. 7, 2023

(87) PCT Pub. No.: WO2022/068126
PCT Pub. Date: Apr. 7, 2022

(65) Prior Publication Data
US 2025/0266089 A1  Aug. 21, 2025

(30) Foreign Application Priority Data
Sep. 30, 2020 (CN) .......................... 202011069668.3

(51) Int. Cl.
G11C 13/00 (2006.01)
(52) U.S. Cl.
CPC ...... *G11C 13/0069* (2013.01); *G11C 13/0007* (2013.01); *G11C 13/003* (2013.01); *G11C 2013/0078* (2013.01); *G11C 2213/79* (2013.01)

(58) Field of Classification Search
CPC ............ G11C 13/0069; G11C 13/0007; G11C 13/003; G11C 2013/0078; G11C 2213/79; G11C 13/00
(Continued)

(56) References Cited

U.S. PATENT DOCUMENTS

2016/0322100 A1* 11/2016 Tsai ...................... G11C 29/028
2019/0279714 A1    9/2019 Fackenthal et al.
(Continued)

FOREIGN PATENT DOCUMENTS

CN   101882462 A   11/2010
CN   104240757 A   12/2014
CN   105719691 A   6/2016

OTHER PUBLICATIONS

Written Opinion issued for corresponding international patent application No. PCT/CN2021/073534, mailed Jul. 6, 2021 (3 pages).
(Continued)

*Primary Examiner* — Fernando Hidalgo
(74) *Attorney, Agent, or Firm* — Osha Bergman Watanabe & Burton LLP

(57) ABSTRACT

A method for operating a memory cell and a resistive random access memory, and an electronic device are provided. The method for operating a memory cell includes: performing a writing operation and an erasing operation on a resistive device. The writing operation includes: applying a writing voltage on the resistive device; determining whether a resistance value of the resistive device reaches a low resistance state threshold; and applying a constant current to the resistive device in response to the resistance value of the resistive device reaching the low resistance state threshold, wherein a voltage value generated by the constant current on the resistive device is smaller than a voltage value of the writing voltage.

9 Claims, 5 Drawing Sheets

(58) Field of Classification Search
USPC .......................................................... 365/148
See application file for complete search history.

(56) References Cited

U.S. PATENT DOCUMENTS

2019/0371397 A1* 12/2019 Chou ................... G11C 13/003
2020/0381048 A1* 12/2020 Le Gallo-Bourdeau .....................
G11C 13/0069

OTHER PUBLICATIONS

Search Report issued for correspoding international patent application No. PCT/CN2021/073534, mailed Jul. 6, 2021 (5 pages).

\* cited by examiner

METHOD FOR OPERATING MEMORY CELL AND RESISTIVE RANDOM ACCESS MEMORY, AND ELECTRONIC DEVICE

CROSS REFERENCE TO RELATED APPLICATION

This application is a Section 371 National Stage Application of International Application No. PCT/CN2021/073534, filed on Jan. 25, 2021, entitled "METHOD FOR OPERATING MEMORY CELL AND RESISTIVE RANDOM ACCESS MEMORY, AND ELECTRONIC DEVICE", which is incorporated herein by reference in its entirety which claims priority to Chinese Application No. 202011069668.3, filed on Sep. 30, 2020, incorporated herein by reference in their entirety.

TECHNICAL FIELD

The present disclosure belongs to a field of memory technology, and relates to a method for operating a memory cell and a resistive random access memory, and an electronic device.

BACKGROUND

With a rapid development of cloud computing, edge computing and other technologies, System-on-Chip (SOC) has a higher demand on a performance and power consumption of an embedded memory. However, with a further miniaturization of semiconductor processes, especially after entering a 28 nm process node, an integration difficulty of a traditional embedded flash memory with advanced logic processes represented by High-K Metal Gate (HKMG) and Fin Field Effect Transistor (FinFET) is further increased. Not only a fabrication cost increases significantly, but also a device performance is seriously degraded due to a reduction of device size, thus it is difficult for a traditional flash memory to extend below 40 nm.

Resistive Random Access Memory (RRAM) has advantages of simple structure, small size and high integration level, and the like, and a preparation process of RRAM is independent of Front End of Line (FEOL), compatible with advanced logic processes such as HKMG and FinFET, thus RRAM is a solution for an embedded nonvolatile memory of an advanced node (below 28 nm).

Resistive Random Access Memory may have a high resistance state and a low resistance state under the excitation of pulse voltages of different polarities, and may be used as a memory or logic device based on different resistance state differences. However, in a writing operation or erasing operation, due to a fluctuation of programming parameter of a resistive device, in order to ensure a programming success rate of the resistive device, a larger device parameter is selected for a programming operation, which may lead to problems of large fluctuation of high resistance state and poor uniformity of the device, and also may lead to a reduction of durability and data retention characteristics of the device.

Therefore, it is necessary to propose an operation method capable of improving at least one of uniformity and data retention characteristics of the resistive random access memory.

SUMMARY

In view of the above, the present disclosure provides a method for operating a memory cell and a resistive random access memory, and an electronic device, so as to improve at least one of uniformity and data retention characteristics of the resistive random access memory.

A first aspect of the present disclosure provides a method for operating a memory cell, wherein the memory cell includes: a resistive device; the method for operating a memory cell described above includes: performing a writing operation on the resistive device, wherein the writing operation includes: applying a first voltage for writing on the resistive device; determining whether a resistance value of the resistive device reaches a low resistance state threshold during a period of applying a writing voltage; and applying a constant current to the resistive device in response to the resistance value of the resistive device reaching the low resistance state threshold, wherein a voltage value generated by the constant current on the resistive device is smaller than a voltage value of the first voltage.

According to embodiments of the present disclosure, the writing operation described above further includes: determining whether a duration of applying the constant current to the resistive device is greater than a first preset duration during a period of applying the constant current; stopping loading the constant current applied to the resistive device in response to the duration of applying the constant current to the resistive device being greater than the first preset duration.

According to embodiments of the present disclosure, the writing operation described above further includes: determining whether a voltage value of the resistive device is greater than a preset voltage value during a period of applying the constant current; and stopping loading the constant current applied to the resistive device in response to the voltage value of the resistive device being greater than the preset voltage value.

According to embodiments of the present disclosure, the method described above further includes: performing an erasing operation on the resistive device, wherein the erasing operation includes: applying a second voltage for erasing on the resistive device; determining whether a resistance value of the resistive device reaches a reference resistance value during a period of applying an erasing voltage; and applying a constant voltage to the resistive device in response to the resistance value of the resistive device reaching the reference resistance value, wherein a voltage value of the constant voltage is smaller than a voltage value of the second voltage.

According to embodiments of the present disclosure, the erasing operation described above further includes: determining whether a duration of applying the constant voltage to the resistive device is greater than a second preset duration during a period of applying the constant voltage; and stopping loading the constant voltage applied to the resistive device in response to the duration of applying the constant voltage to the resistive device being greater than the second preset duration.

According to embodiments of the present disclosure, the erasing operation described above further includes: determining whether a passing current of the resistive device is smaller than a preset current value during a period of applying the constant voltage; and stopping loading the constant voltage applied to the resistive device in response to the passing current of the resistive device being smaller than the preset current value.

According to embodiments of the present disclosure, the memory cell further includes: a transistor connected in series with the resistive device, wherein a gate electrode of the transistor is configured to connect to a word line, a source electrode of the transistor is configured to connect to a source line, a drain electrode of the transistor is connected to one electrode end of the resistive device, and another electrode end of the resistive device is configured to connect to a bit line.

A specific pulse is applied to the word line corresponding to the transistor connected with the resistive device, the source line corresponding to a transistor connected with the resistive device is maintained at a low level, and the bit line connected with the resistive device is maintained at a high level, so as to realize the writing operation on the resistive device. The specific pulse described above is a sequence in which a first voltage and a third current are successively and continuously loaded, and a current value of the third current is equal to a current value of the constant current.

Another specific pulse is applied to the source line corresponding to the transistor connected with the resistive device, the word line corresponding to the transistor connected with the resistive device is maintained at a high level, and the bit line connected with the resistive device is maintained at a low level, so as to realize the erasing operation on the resistive device. The another specific pulse described above is a sequence in which a second voltage and a fourth voltage are successively and continuously loaded, and a voltage value of the fourth voltage is equal to a voltage value of the constant voltage.

A second aspect of the present disclosure provides a method for operating a resistive random access memory. The resistive random access memory includes a memory array, and the memory array includes at least two memory cells. The method for operating a resistive random access memory described above includes: selecting a target memory cell based on a word line and a bit line; and performing the method for operating a memory cell described above for the target memory cell.

A third aspect of the present disclosure provides an electronic device. The electronic device described above includes: one or more processors; and a storage medium for storing one or more programs; wherein, the one or more programs, when executed by the one or more processors, cause the one or more processors to perform any one of the method for operating a memory cell described above; the electronic device is independent of the memory cell, or the electronic device includes the memory cell; or the one or more programs, when executed by the one or more processors, cause the one or more processors to perform the method for operating a resistive random access memory described above; the electronic device is independent of the resistive random access memory, or the electronic device includes the resistive random access memory.

DETAILED DESCRIPTION OF EMBODIMENTS

Figure 1:
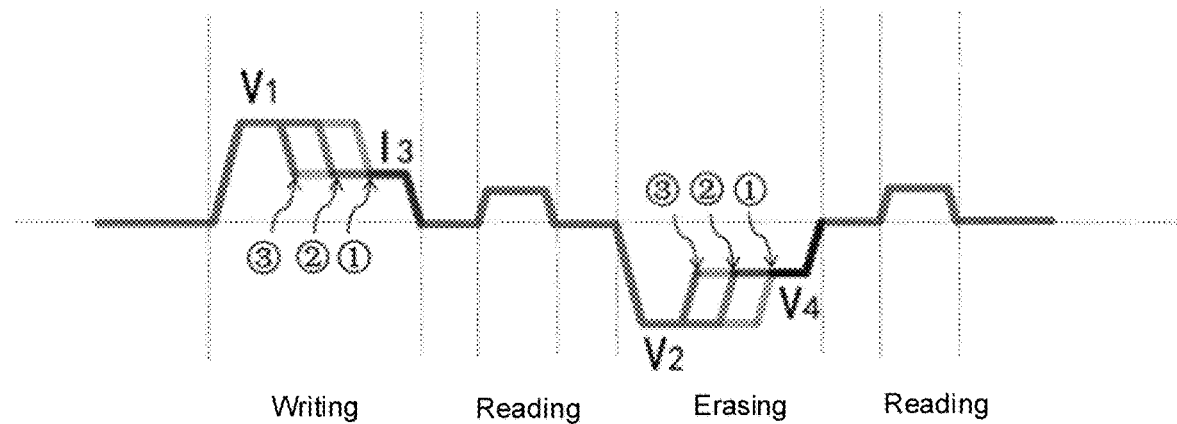
FIG. 1 shows a pulse timing diagram corresponding to a method for operating a memory cell according to an embodiment of the present disclosure.

Resistive Random Access Memory (RRAM) is generally an array structure having a plurality of memory cells, and each memory cell may be a 1T-1R structure, i.e., a structure including one transistor and one resistive device. The resistive device includes: a resistive material layer, and electrode layers located on upper and lower sides of the resistive material layer. Under the excitation of different pulse voltages, the resistive material layer presents different resistance characteristics and has different resistance states. Under a writing (also called programming) operation, a set operating voltage is applied to the resistive random access memory, and oxygen ions in the RRAM move to an oxygen storage layer at an upper electrode, so as to form an oxygen vacancy conductive filament in the resistive material layer, and the corresponding RRAM is in a low resistance state. Under an erasing operation, a reset operating voltage is applied to the resistive random access memory, and oxygen ions recombine with oxygen vacancies, causing the conductive filament to break, and the corresponding RRAM is in a high resistance state.

Due to a fluctuation of a programming parameter of the resistive device, in order to ensure a programming success rate of the resistive device, a larger device parameter is generally selected for programming. Therefore, for a device in a memory array, a phenomenon of over-programming often occurs, and a formed conductive filament is thicker. In this case, in a subsequent erasing process, higher energy is required for filament breakage, and incomplete filament breakage is easy to occur, a phenomenon of soft failure may occur, so that a durability of the device may be reduced. An incomplete erasing phenomenon of the device may also lead to: a high resistance state fluctuation of the device is relatively large, and uniformity of the device is deteriorated.

Some studies have proposed to reduce the over-programming of the device by using adaptive programming. When a resistance value of the resistive device reaches a low resistance state threshold, an applied voltage is immediately removed to prevent the over-programming of the device.

However, the inventor found in a process of realizing a concept of the present disclosure that: when a filament formation is unstable, or there are residual oxygen ions in a gap region of a broken filament, retention characteristics and stability of the device may be deteriorated. The adaptive programming may slow down a degradation speed of the device and prolong a life of the device. However, under this programming condition, after the set operation of the device is completed, although the conductive filament in the device is formed, the conductive filament is not very stable, oxygen ions recombine with oxygen vacancies, and a phenomenon of relaxation may occur, leading to changes in the resistance state of the device, which is often manifested as poor retention capacity of the low resistance state and unstable operation of the device. For the adaptive programming, during the reset process of the device, a voltage excitation stops when the device reaches a reference resistance value. There are residual oxygen vacancies in a gap between the residual filament and the electrode in the device. In a subsequent retention process, the residual oxygen vacancies may be reconnected with the filament, resulting in a smaller resistance value and a decline in the retention capacity of the device.

In view of the above, the present disclosure proposes a method for operating a memory cell, a method for operating a resistive random access memory, and also provides an electronic device, which may improve uniformity, data retention characteristics of the resistive device, and durability of the device.

In order to make the objectives, technical solutions and advantages of the present disclosure more apparent, the present disclosure will be further described in detail below with reference to the specific embodiments and the accompanying drawings.

A first exemplary embodiment of the present disclosure provides a method for operating a memory cell. The memory cell includes: a resistive device.

Figure 2:
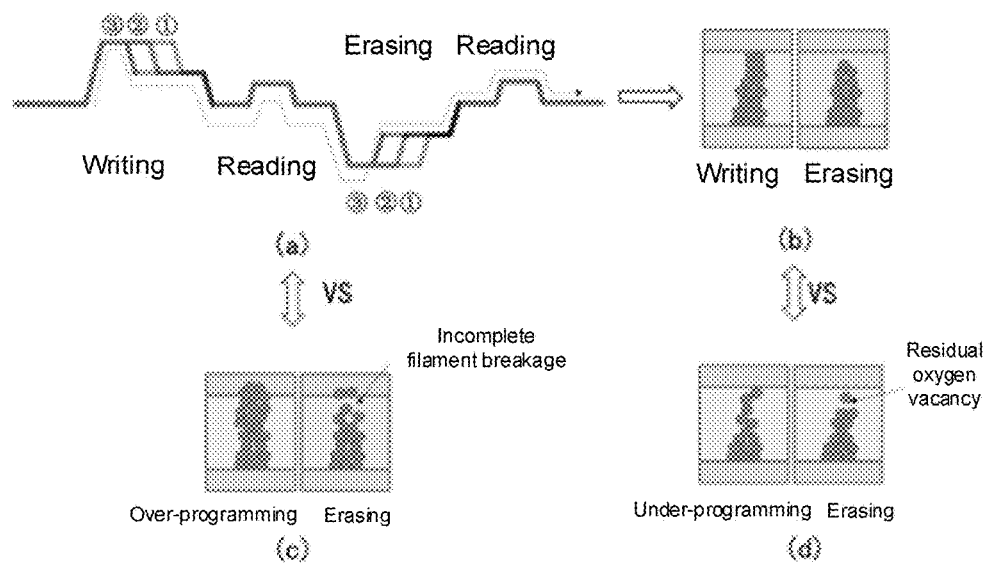
FIG. 2 shows (a) an exemplary path, (b) a state diagram of the resistive device corresponding to a writing and an erasing of a method for operating a memory cell according to an embodiment of the present disclosure; (c) shows a state diagram of the resistive device corresponding to an over-programming in the existing method, and (d) shows a state diagram of the resistive device corresponding to an under-programming in the existing method.
Figure 3:
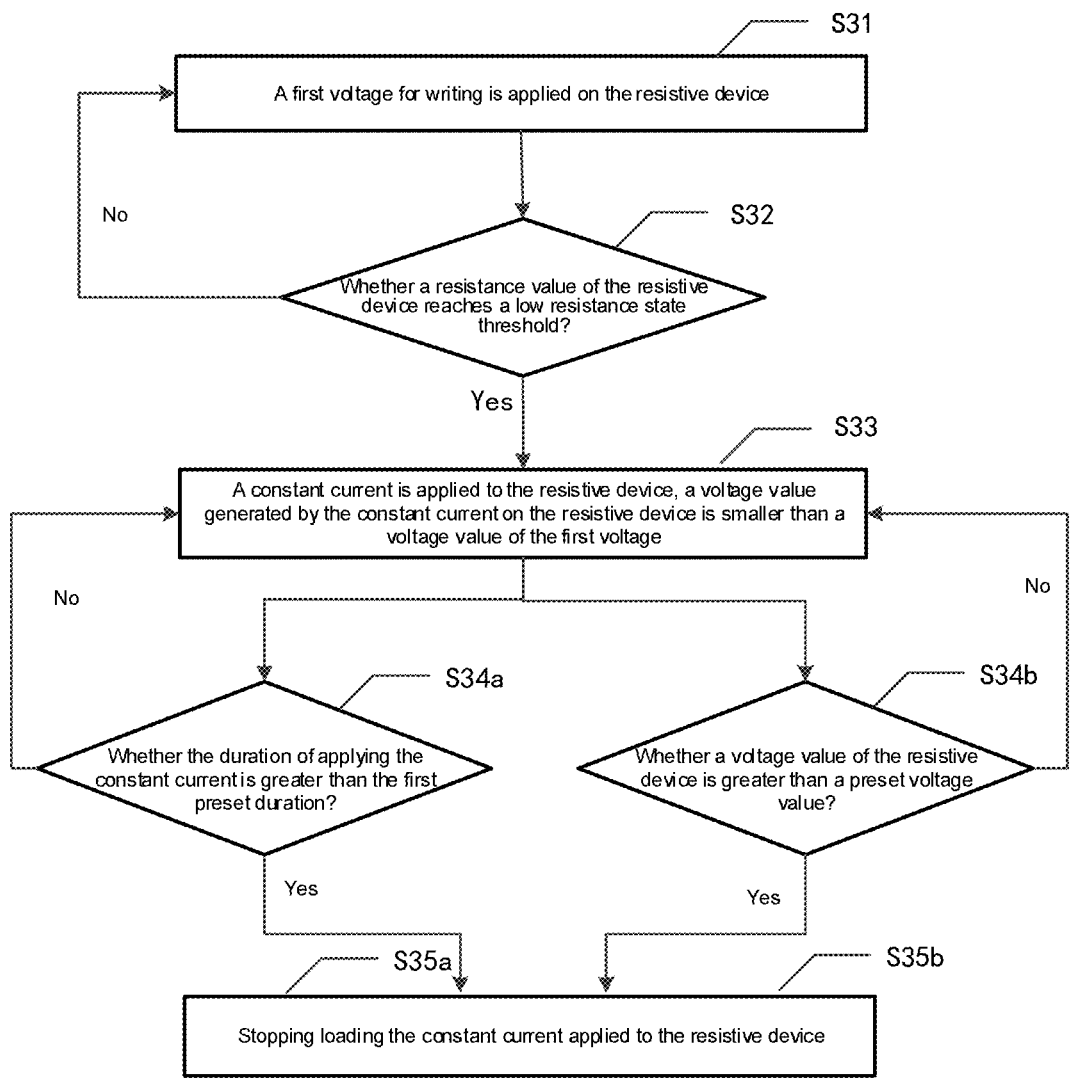
FIG. 3 shows a flowchart of a writing operation method of a memory cell according to an embodiment of the present disclosure.

FIG. 1 shows a pulse timing diagram corresponding to a method for operating a memory cell according to an embodiment of the present disclosure. FIG. 2 shows (a) an exemplary path, (b) a state diagram of the resistive device corresponding to a writing and an erasing of a method for operating a memory cell according to an embodiment of the present disclosure, wherein (c) shows a state diagram of the resistive device corresponding to an over-programming in the existing method, and (d) shows a state diagram of the resistive device corresponding to an under-programming in the existing method. FIG. 3 shows a flowchart of a writing operation method of a memory cell according to an embodiment of the present disclosure. In the pulse timing diagrams shown in FIG. 1 and FIG. 2, a left-right direction is a time axis, and an up-down direction is a voltage axis. Horizontal dotted lines in FIG. 1 indicate a same horizontal line, and vertical dotted lines indicate different operation stages, including four stages: writing, reading, erasing, and reading.

As shown in FIG. 1, (a) and (b) of FIG. 2, and FIG. 3, a method for operating a memory cell according to an embodiment of the present disclosure includes: performing a writing operation on a resistive device. The writing operation includes following steps: S31 to S33.

In Step S31, a first voltage for writing is applied on the resistive device.

In Step S32, whether a resistance value of the resistive device reaches a low resistance state threshold is determined during a period of applying a writing voltage.

According to an embodiment, during the period of applying a writing voltage, the above-mentioned determining whether a resistance value of the resistive device reaches a low resistance state threshold includes: during the period of applying a writing voltage, determining whether a resistance value of the resistive device reaches a low resistance state threshold according to whether a pass current $I_{pass1}$ of the resistive device being greater than a first reference value $I_{ref1}$. The first reference value $I_{ref1}$ and the low resistance state threshold $R_{ref1}$ have the following relationship: $I_{ref1} \times R_{ref1} = V_1$, where $V_1$ represents a voltage value of the first voltage.

The above-mentioned low resistance state threshold may be a range, and then the corresponding first reference value is also a range. In a determination process, if the low resistance state threshold is a range, the first reference value calculated from any value within the low resistance threshold range may be used for determination, so as to determine a timing of entering a constant current application. For example, in FIG. 1, three different loading timings of the constant currents corresponding to paths ③, ②, and ① during the writing period are indicated by curved arrows, and (a) in FIG. 2 shows a pulse timing direction corresponding to each stage of writing, reading, erasing and reading corresponding to the path ③.

In step S33, a constant current is applied to the resistive device in response to the resistance value of the resistive device reaching the low resistance state threshold, a voltage value generated by the constant current on the resistive device is smaller than a voltage value of the first voltage.

Exemplarily, the voltage value generated by the above-mentioned constant current on the resistive device is 1/10 to 1/2 of the voltage value of the first voltage, including end-point values. For example, the voltage value generated by the constant current on the resistive device is 3/10, 1/3, 2/5 or 1/2 of the voltage value of the first voltage.

As shown in FIG. 1, when the resistance value of the resistive device reaches the low resistance state threshold, a constant current is applied to the resistive device. The current value of the constant current is shown as $I_3$, and the voltage value generated by the constant current on the resistive device is less than the voltage value of the first voltage. During a period of applying a constant current, it is a process of stabilizing the formed conductive filament, and the resistance value of the resistive device itself may fluctuate or change. A selection of the current value $I_3$ of the above-mentioned constant current needs to satisfy: the voltage value generated on the resistive device by the above-mentioned constant current is always smaller than the voltage value $V_1$ of the first voltage.

In the related art, in order to ensure the programming success rate of the resistive device, a larger device parameter is generally selected for programming. Therefore, for the device in the memory array, the phenomenon of over-programming often occurs, and the formed conductive filament is thicker, as shown in a left figure of (c) in FIG. 2. In this case, in a subsequent erasing process, higher energy is required for filament breakage, and incomplete filament breakage is easy to occur. As shown in a right figure of (c) in FIG. 2, a phenomenon of soft failure may occur, so that a durability of the device may be reduced.

In the related art, an adaptive programming method is used to reduce the over-programming of the device. When the resistance value of the resistive device reaches a low resistance state threshold, the applied voltage is immediately removed to prevent the over-programming of the device. Under this programming condition, after the set operation of the device is completed, although a conductive filament in the device is formed, the conductive filament is not very stable, and there is a phenomenon of under-programming. As shown in a left figure of (d) in FIG. 2, oxygen ions recombine with oxygen vacancies, and a phenomenon of relaxation may occur, leading to changes in the resistance state of the device, which is often manifested as poor retention capacity of the low resistance state and unstable operation of the device. During a reset process of the device, a voltage excitation stops when the device reaches a reference resistance value. There are residual oxygen vacancies in a gap between the residual filament and the electrode in the device, as shown in a right figure of (d) in FIG. 2. In a subsequent retention process, the residual oxygen vacancies may be reconnected with the filament, resulting in a smaller resistance value and a decline in the retention capacity of the device.

As shown by comparing the device states shown in (b), (c) and (d) in FIG. 2, according to embodiments of the present disclosure, in the writing operation, the resistive device may be programmed based on a written first voltage, and a conductive filament may be formed in the resistive material layer. After the resistive device reaches the low resistance state threshold, the resistive device is successfully set. However, a local region of the formed conductive filament may be relatively thin, and the formed conductive filament may be not very stable. If oxygen ions and oxygen vacancies recombine, a relaxation phenomenon may occur. Therefore, the present disclosure continues to apply a relatively small constant current to the resistive device, so as to, in a set process of the resistive device, promote the stability of the formation of the conductive filament, as shown in a left figure of (b) in FIG. 2, improve the retention capability of the device in the low resistance state, improve the uniformity and data retention characteristics of the resistive device, and also improve the durability of the device.

According to embodiments of the present disclosure, the above-mentioned writing operation further includes: a step of determining whether to stop loading the constant current.

As shown in FIG. 3, the above-mentioned step of determining whether to stop loading the constant current may include: Step S34a and Step S35a, or Step S34b and Step S35b.

In Step S34a, whether the duration of applying the constant current to the resistive device is greater than the first preset duration is determined during the period of applying the constant current.

In Step S35a, in response to the duration of applying the constant current to the resistive device being greater than the first preset duration, stopping loading the constant current applied to the resistive device.

In Step S34b, whether a voltage value of the resistive device is greater than a preset voltage value is determined during the period of applying a constant current.

In Step S35b, in response to the voltage value of the resistive device being greater than a preset voltage value, stopping loading the constant current applied to the resistive device.

In the writing operation, a duration or degree of applying a constant current may be controlled based on a limitation of the first preset duration or the preset voltage value, which may effectively ensure a formation of the conductive filament of the resistive device more stable, and effectively prevent the resistive device from moving towards a direction of high resistance value due to the constant current being applied for overlong time or being applied to overlarge degree.

The above-mentioned first preset duration and preset voltage value may be set according to actual needs. The above-mentioned conditions are to avoid that the loading time/degree of the constant current is too large, which may cause the resistance state of the resistive device to be further increased after the low resistance state is stable, thus it is necessary to stop loading the constant current at a proper time.

Figure 4:
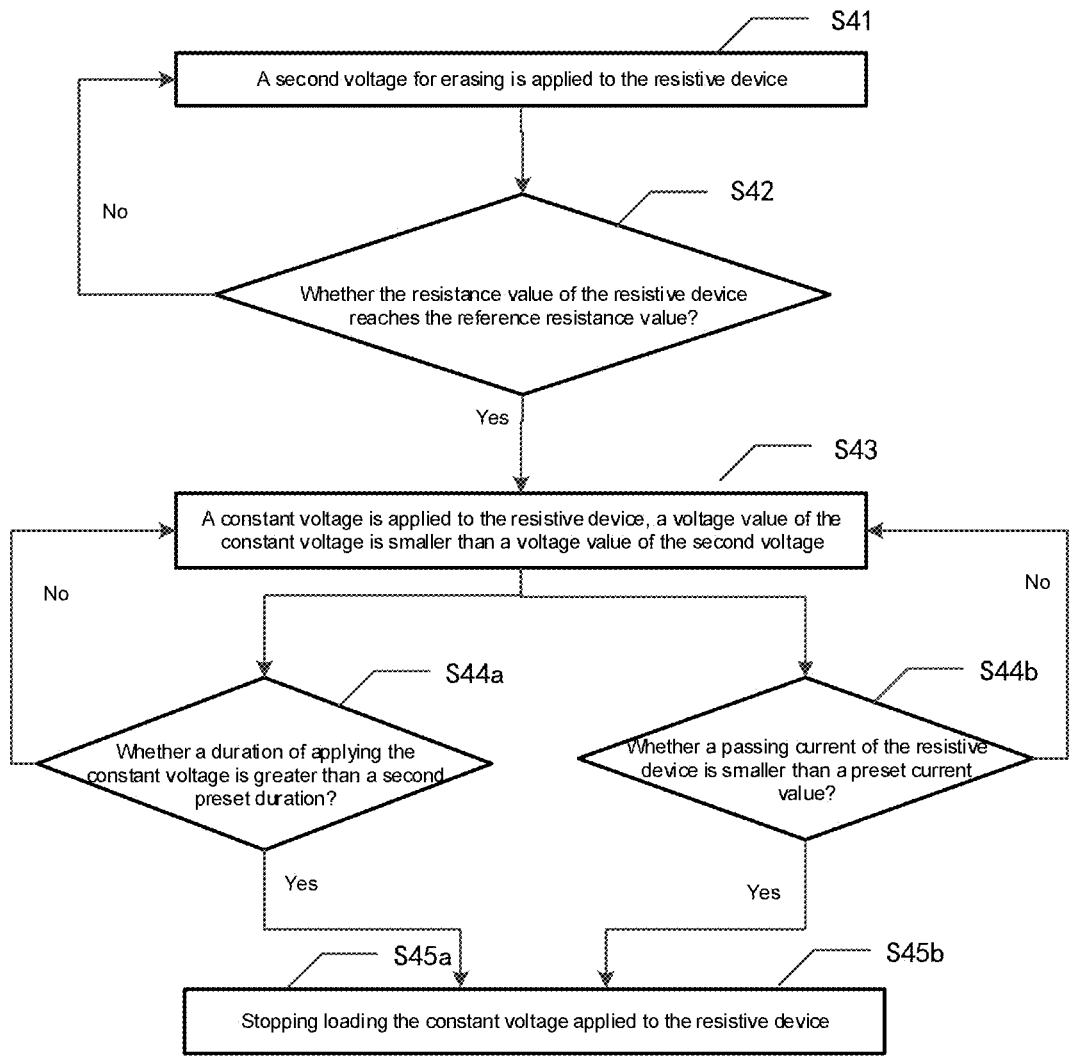
FIG. 4 shows a flowchart of an erasing operation method of a memory cell according to an embodiment of the present disclosure.

FIG. 4 shows a flowchart of an erasing operation method of a memory cell according to an embodiment of the present disclosure.

According to embodiments of the present disclosure, the above-mentioned operation method further includes: performing an erasing operation on the resistive device. The erasing operation includes following steps: S41 to S43.

In Step S41, a second voltage for erasing is applied to the resistive device.

In Step S42, whether the resistance value of the resistive device reaches the reference resistance value is determined during the period of applying the erasing voltage.

According to an embodiment, during the period of applying the erasing voltage, the above-mentioned determining whether the resistance value of the resistive device reaches the reference resistance value includes: during the period of applying the erasing voltage, according to whether a pass current $I_{pass2}$ of the resistive device is greater than the second reference value $I_{ref2}$, determining whether the resistance value of the resistive device reaches the reference resistance value. The second reference value $I_{ref2}$ and the reference resistance value $R_{ref2}$ have the following relationship: $I_{ref2} \times R_{ref2} = V_2$, where $V_2$ represents the voltage value of the second voltage.

The above-mentioned reference resistance value may be a range, and then the corresponding second reference value is also a range. In a determination process, if the reference resistance value is a range, the second reference value calculated from any value within the reference resistance value range may be used for determination, so as to determine a timing of entering a constant voltage application. For example, in FIG. 1, three different loading timings of the constant voltages corresponding to the paths ③, ②, and ① during the erasing period are indicated by curved arrows.

In Step S43, a constant voltage is applied to the resistive device in response to the resistance value of the resistive device reaching the reference resistance value, wherein a voltage value of the constant voltage is smaller than a voltage value of the second voltage.

As shown in FIG. 1, in response to the resistance value of the resistive device reaching the reference resistance value, a constant voltage is applied to the resistive device, and the voltage value of the constant voltage is shown as $V_4$, and the voltage value $V_4$ of the constant voltage is smaller than the voltage value $V_2$ of the second voltage.

Exemplarily, the voltage value of the above-mentioned constant voltage is 1/10 to 1/2 of the voltage value of the second voltage, including endpoint values. For example, the voltage value of the constant voltage is 1/5, 3/10, 1/3, or 2/5 of the voltage value of the second voltage.

As shown by comparing the device states shown in (b), (c) and (d) in FIG. 2, according to embodiments of the present disclosure, in the erasing operation, the resistive device is erased based on the second voltage, such that oxygen ions and oxygen vacancies in the device recombine, resulting in a breakage of the conductive filament. If the resistance value of the resistive device reaches the reference resistance value, the resistive device is successfully reset. However, there may be a phenomenon that the conductive filament is not completely broken, and there may be oxygen vacancies in a broken gap region. Then a relatively small constant voltage is applied to the resistive device, such that in the reset process of the resistive device, the oxygen vacancies in the gap of the resistive material layer may be removed, and the high resistance state retention characteristics of the device may be improved, as shown in a right figure in (b) of FIG. 2, the distribution of the resistance value in the high resistance state of the device may be more concentrated, the uniformity and data retention characteristics of the resistive device may be improved, a soft failure of the device may be reduced, and a durability of the device may also be improved.

According to embodiments of the present disclosure, the above-mentioned erasing operation further includes: a step of determining whether to stop loading the constant voltage.

As shown in FIG. 4, the above-mentioned step of determining whether to stop loading the constant voltage may include: Step S44a and Step S45a, or Step S44b and Step S45b.

In Step S44a, whether a duration of applying the constant voltage to the resistive device is greater than a second preset duration is determined during a period of applying a constant voltage.

In Step S45a, stopping loading the constant voltage applied to the resistive device in response to the duration of applying the constant voltage to the resistive device being greater than the second preset duration.

In Step S44b, whether a passing current of the resistive device is smaller than a preset current value is determined during the period of applying a constant voltage.

In Step S45b, stopping loading the constant voltage applied to the resistive device in response to the passing current of the resistive device being smaller than the preset current value.

In the erasing operation, a duration or degree of applying the constant voltage may be controlled based on a limitation of the second preset duration or the preset current value, which may ensure that the conductive filament of the resistive device is completely broken, and effectively prevent the resistive device from moving to a higher resistance value direction due to the constant voltage being applied for overlong time or being applied to overlarge degree, so as to avoid higher energy consumption in a next writing operation.

The above-mentioned second preset duration and preset current value may be set according to actual needs. The above-mentioned conditions are to avoid that the constant voltage loading time/degree is too large, which may cause the high resistance state of the resistive device to be further increased after the high resistance state is realized, thus it is necessary to stop loading the constant voltage at a proper time.

Figure 5:
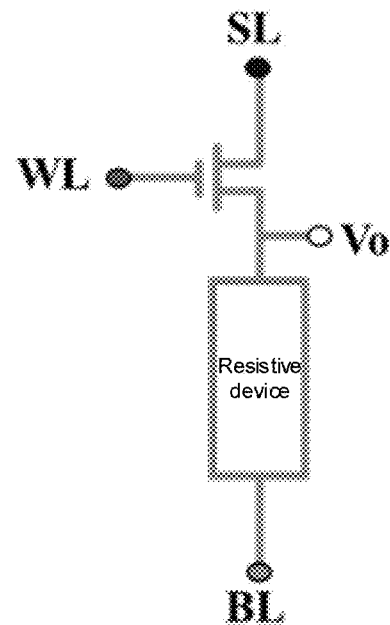
FIG. 5 shows a schematic structural diagram of a memory cell according to an embodiment of the present disclosure.

FIG. 5 shows a schematic structural diagram of a memory cell according to an embodiment of the present disclosure.

According to embodiments of the present disclosure, as shown in FIG. 5, the above-mentioned memory cell includes: a resistive device, a transistor connected in series with the resistive device, wherein a gate electrode of the transistor is used for connecting with a word line WL, a source electrode of the transistor is used for connecting with a source line SL, a drain electrode of the transistor is connected with one electrode end of the resistive device, and the other electrode end of the resistive device is used for connecting with a bit line BL. An equivalent voltage drawn from one electrode terminal of the resistive device is $V_o$.

Figure 6:
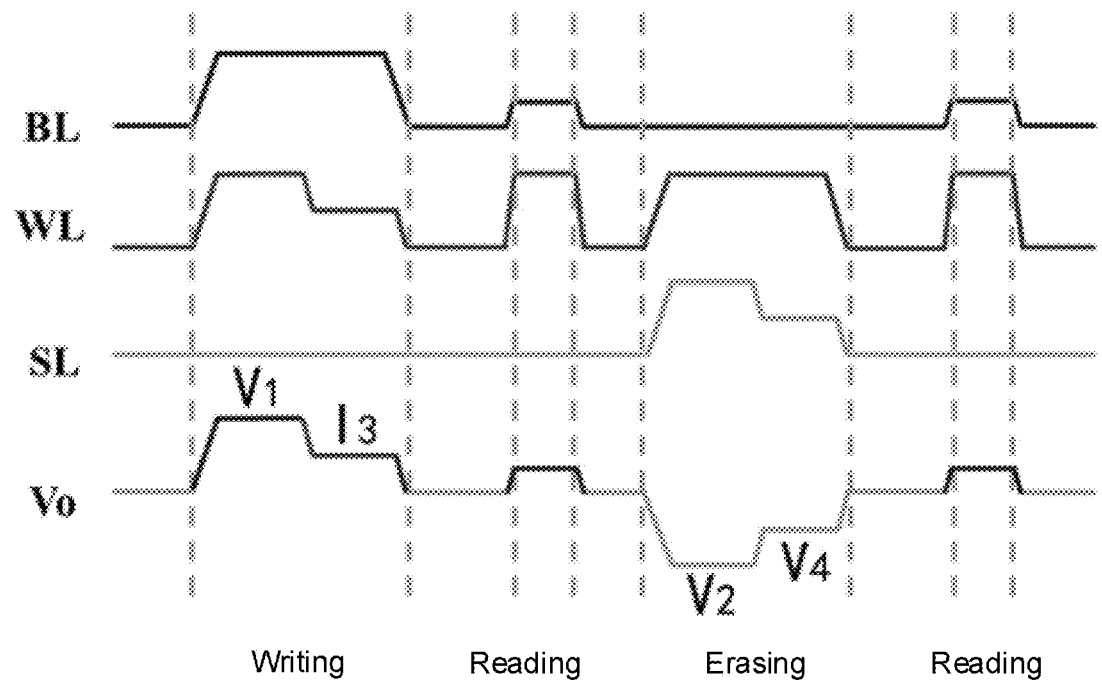
FIG. 6 shows a pulse timing diagram of a word line, a bit line, a source line and an equivalent voltage on a resistive device corresponding to a 1T1R structure of a memory cell according to an embodiment of the present disclosure.

FIG. 6 shows a pulse timing diagram of a word line, a bit line, a source line and an equivalent voltage on a resistive device corresponding to a 1T1R structure of a memory cell according to an embodiment of the present disclosure.

As shown in FIG. 6, timing diagrams of the word line WL, the bit line BL, the source line SL and the equivalent voltage $V_o$ are respectively illustrated. A specific pulse is applied to the word line WL corresponding to the transistor connected to the resistive device, the source line SL corresponding to the transistor connected to the resistive device is maintained at a low level, and the bit line BL connected to the resistive device is maintained at a high level, so as to realize the writing operation to the resistive device. The above-mentioned specific pulse is a sequence in which the first voltage and the third current are successively and continuously loaded, and the current value of the third current is equal to the current value of the constant current.

As shown in FIG. 6, another specific pulse is applied to the source line SL corresponding to the transistor connected to the resistive device, the word line WL corresponding to the transistor connected to the resistive device is maintained at a high level, and the bit line BL connected to the resistive device is maintained at a low level, so as to realize the erasing operation on the resistive device. Another specific pulse is a sequence in which the second voltage and the fourth voltage are successively and continuously applied, and the voltage value of the fourth voltage is equal to the voltage value of the constant voltage.

In embodiments of the present disclosure, the above-mentioned operation method further includes: a reading operation performed after the writing operation and a reading operation performed after the erasing operation. The above-mentioned reading operation is the same as that in the prior art, and will not be described in detail here.

Based on the same technical concept, a second exemplary embodiment of the present disclosure provides a method for operating a resistive random access memory. The resistive random access memory includes a memory array, and the memory array includes at least two memory cells.

The method for operating a resistive random access memory in this embodiment includes: selecting a target memory cell based on a word line and a bit line; performing any one of the method for operating a memory cell described above for the target memory cell.

In the resistive random access memory, the memory array is an array structure, and the memory cell corresponding to a specific row and column may be selected based on a decoder, and the selected memory cell is the target memory cell. The operation method described in the first embodiment is performed on the target memory cell, and the resistive random access memory after writing, reading, erasing and reading based on the above-mentioned operation method has good resistance state uniformity and data retention characteristics, and has good durability.

Figure 7:
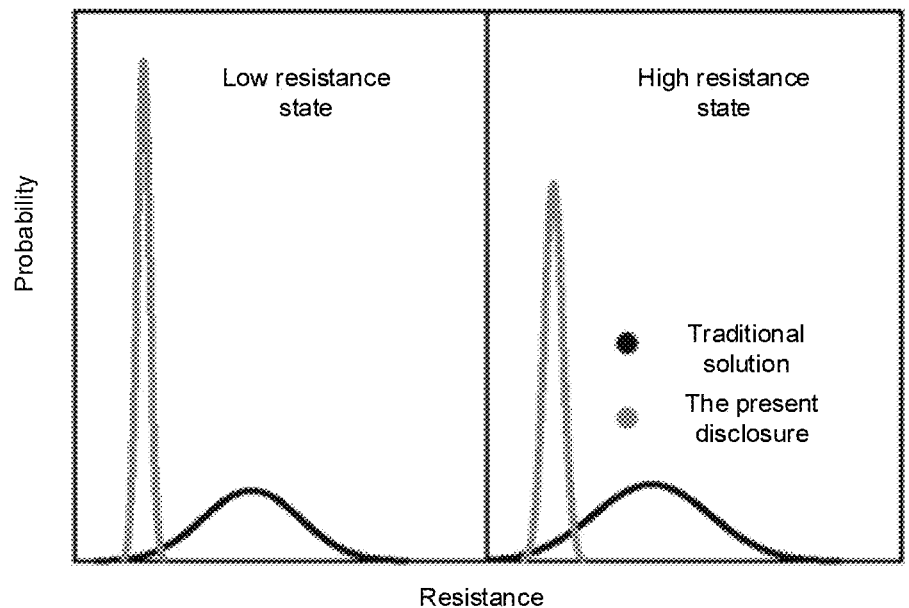
FIG. 7 shows a distribution diagram of high and low resistance states after a programming operation is performed on the resistive random access memory by comparing the existing solution with a method for operating a resistive random access memory shown in embodiments of the present disclosure.
Figure 8:
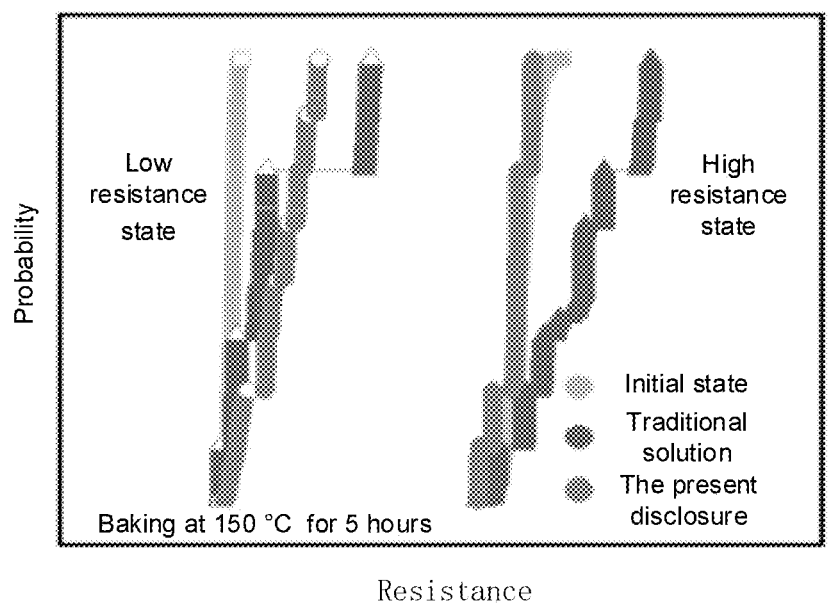
FIG. 8 shows a data retention characteristic diagram obtained by baking the resistive random access memory at 150° C. for 5 hours after performing a programming operation on the resistive random access memory by comparing the existing solution with a method for operating a resistive random access memory shown in the embodiment of the present disclosure.

FIG. 7 shows a distribution diagram of high and low resistance states after a programming operation is performed on the resistive random access memory by comparing the existing solution with a method for operating a resistive random access memory according to the embodiment of the present disclosure. FIG. 8 shows a data retention characteristic diagram obtained by baking the resistive random access memory at 150° C. for 5 hours after performing a programming operation on the resistive random access memory by comparing the existing solution with a method for operating a resistive random access memory shown in the embodiment of the present disclosure.

In an example, the existing adaptive programming method and the operation method of the embodiments of the present disclosure are used to perform programing (writing) operation on the resistive random access memory, and a distribution comparison diagram of the high and low resistance states of the resistive random access memory obtained by testing is shown in FIG. 7. As show in FIG. 7, using the solution of embodiments of the present disclosure may make a distribution of the high resistance state and the low resistance state of the device concentrated, reduce a fluctuation, and significantly improve the uniformity of the device.

In another example, after performing programing (writing) operation on the resistive random access memory by using the existing adaptive programming method and the operation method of the embodiment of the present disclosure, and after baking the resistive random access memory at 150° C. for 5 hours, data retention performance is tested, a comparison diagram of data retention characteristics obtained by testing is shown in FIG. 8. As shown in FIG. 8, after performing programing operation on the device by using the solution according to embodiments of the present disclosure, the retention capability of the device is significantly improved.

A third exemplary embodiment of the present disclosure provides an electronic device.

The above-mentioned electronic device includes: one or more processors; and a storage medium for storing one or more programs, wherein, the one or more programs, when executed by the one or more processors, cause the one or more processors to perform any one of the above-mentioned method for operating the memory cell; the electronic device is independent of the memory cell, or the electronic device includes the memory cell; or the one or more programs, when executed by the one or more processors, cause the one or more processors to perform the above-mentioned method for operating a resistive random access memory; the electronic device is independent of the resistive random access memory, or the electronic device includes the resistive random access memory.

In summary, the present disclosure provides a method for operating a memory cell and a resistive random access memory, and an electronic device. For the set process, a constant current is continuously applied on the basis of the adaptive programming, such that in the set process, after the formation of the conductive filament, a constant small current is continued to flow through the device, so that the formed filament is more stable on the basis of successful programming of the device, so as to improve the retention capability of the device in the low resistance state. Similarly, for the reset process, after the conductive filament is broken, a small constant voltage is continuously applied, which may remove the oxygen vacancies in the gap, so as to improve the high resistance state retention characteristics of the device. At the same time, by adopting the solution of the present disclosure, the distribution of the high resistance state resistance value of the device may be more concentrated, the uniformity of the device may be improved, the soft failure of the device may be reduced, and the durability of the device may be improved.

Based on the technical solutions described above, the method for operating the memory cell and the resistive random access memory and the electronic device provided by embodiments of the present disclosure has at least following beneficial effects.

(1) In the writing operation, the resistive device is programmed based on a written first voltage, a conductive filament may be formed in a resistive material layer, and after the resistive device reaches a low resistance state threshold, the resistive device is programmed successfully (or described as set successfully). However, a local region of the formed conductive filament may be relatively thin, and the formed conductive filament may be not very stable. If oxygen ions and oxygen vacancies recombine, relaxation may occur. Then a relatively small constant current is applied to the resistive device, so as to, in a set process of the resistive device, promote a stability of a formation of the conductive filament, improve a retention capability of the device in a low resistance state, improve uniformity and data retention characteristics of the resistive device, and also improve a durability of the device.

(2) In the writing operation, a duration or degree of applying a constant current may be controlled based on a limitation of a first preset duration or a preset voltage value, which may effectively ensure a formation of the conductive filament of the resistive device more stable, and effectively prevent the resistive device from moving towards a direction of high resistance value due to the constant current being applied for overlong time or being applied to overlarge degree.

(3) In the erasing operation, the resistive device is erased based on the second voltage, such that oxygen ions and oxygen vacancies in the resistive device recombine, resulting in a breakage of the conductive filament. If a resistance value of the resistive device reaches a reference resistance value, the resistive device is successfully erased (or described as reset successfully). However, there may be a phenomenon that the conductive filament is not completely broken, and there may be oxygen vacancies in a broken gap region. Then a relatively small constant voltage is applied to the resistive device, such that in the reset process of the resistive device, the oxygen vacancies in the gap of the resistive material layer may be removed, the high resistance state retention characteristics of the device may be improved, a distribution of the resistance value in the high resistance state of the device may be more concentrated, the uniformity and data retention characteristics of the resistive device may be improved, a soft failure of the device may be reduced, and a durability of the device may also be improved.

(4) In the erasing operation, a duration or degree of applying a constant voltage may be controlled based on a limitation of the second preset duration or the preset current value, which may ensure a complete breakage degree of the conductive filament of the resistive device, and effectively prevent the resistive device from moving to a direction of high resistance value due to the constant voltage being applied for overlong time or being applied to overlarge degree, so as to avoid higher energy consumption in a next writing operation.

The use of ordinal numbers such as "first", "second", "third", and the like, in the description and the claims to modify corresponding elements does not mean that the elements have any ordinal numbers nor does it represent an order between one element and another element, or an order of manufacturing method, and the use of the ordinal numbers is only used to distinguish one element having a certain name from another element having the same name.

Furthermore, the word "comprising" or "including" does not exclude the presence of elements or steps not listed in the claims. The word "a" or "an" preceding an element does not exclude the presence of a plurality of such elements.

The specific embodiments described above further detail the objectives, technical solutions and beneficial effects of the present disclosure. It should be understood that the above are only specific embodiments of the present disclosure, and are not intended to limit the scope of the present disclosure, and any modifications, equivalent substitutions, improvements and the like made within the spirit and principle of the present disclosure should all fall within the protection scope of the present disclosure.

What is claimed is:

1. A method for operating a memory cell, the memory cell comprising: a resistive device; the method comprising: performing a writing operation on the resistive device, wherein the writing operation comprises:
   applying a first voltage for writing on the resistive device;
   determining whether a resistance value of the resistive device reaches a low resistance state threshold during a period of applying a writing voltage; and
   applying a constant current to the resistive device in response to the resistance value of the resistive device reaching the low resistance state threshold, wherein a voltage value generated by the constant current on the resistive device is smaller than a voltage value of the first voltage,
   wherein the method further comprises: performing an erasing operation on the resistive device, wherein the erasing operation comprises:
   applying a second voltage for erasing on the resistive device;
   determining whether a resistance value of the resistive device reaches a reference resistance value during a period of applying an erasing voltage; and
   applying a constant voltage to the resistive device in response to the resistance value of the resistive device reaching the reference resistance value, wherein a voltage value of the constant voltage is smaller than a voltage value of the second voltage.

2. The method according to claim 1, wherein the writing operation further comprises:
   stopping loading the constant current applied to the resistive device in response to a duration of applying the constant current to the resistive device being greater than a first preset duration.

3. The method according to claim 1, wherein the writing operation further comprises:
   determining whether a voltage value of the resistive device is greater than a preset voltage value during a period of applying the constant current; and
   stopping loading the constant current applied to the resistive device in response to the voltage value of the resistive device being greater than the preset voltage value.

4. The method according to claim 1, wherein the erasing operation further comprises:
   determining whether a duration of applying the constant voltage to the resistive device is greater than a second preset duration during a period of applying the constant voltage; and
   stopping loading the constant voltage applied to the resistive device in response to the duration of applying the constant voltage to the resistive device being greater than the second preset duration.

5. The method according to claim 1, wherein the erasing operation further comprises:
   determining whether a passing current of the resistive device is smaller than a preset current value during a period of applying the constant voltage; and
   stopping loading the constant voltage applied to the resistive device in response to the passing current of the resistive device being smaller than the preset current value.

6. The method according to claim 1, wherein the memory cell further comprises: a transistor connected in series with the resistive device, wherein a gate electrode of the transistor is configured to connect to a word line, a source electrode of the transistor is configured to connect to a source line, a drain electrode of the transistor is connected to one electrode end of the resistive device, and another electrode end of the resistive device is configured to connect to a bit line;
   wherein a specific pulse is applied to the word line corresponding to the transistor connected with the resistive device, the specific pulse is a sequence in which a first voltage and a third current are successively and continuously loaded, and a current value of the third current is equal to a current value of the constant current; the source line corresponding to the transistor connected with the resistive device is maintained at a low level, and the bit line connected with the resistive device is maintained at a high level, so as to implement the writing operation on the resistive device.

7. The method according to claim 1, wherein the memory cell further comprises: a transistor connected in series with the resistive device, wherein a gate electrode of the transistor is configured to connect to a word line, a source electrode of the transistor is configured to connect to a source line, a drain electrode of the transistor is connected to one electrode end of the resistive device, and another electrode end of the resistive device is configured to connect to a bit line;
   wherein another specific pulse is applied to the source line corresponding to the transistor connected with the resistive device, the another specific pulse is a sequence in which a second voltage and a fourth voltage are successively and continuously loaded, and a voltage value of the fourth voltage is equal to a voltage value of the constant voltage; the word line corresponding to the transistor connected with the resistive device is maintained at a high level, and the bit line connected with the resistive device is maintained at a low level, so as to implement the erasing operation on the resistive device.

8. A method for operating a resistive random access memory, the resistive random access memory comprising a memory array, the memory array comprising at least two memory cells, and the method comprising:
   selecting a target memory cell based on a word line and a bit line; and
   performing the method for operating a memory cell according to claim 1 for the target memory cell.

9. An electronic device, comprising:
   one or more processors; and
   a storage medium for storing one or more programs;
   wherein, the one or more programs, when executed by the one or more processors, cause the one or more processors to perform the method for operating the memory cell according to claim 1; the electronic device is independent of the memory cell, or the electronic device comprises the memory cell; or
   the one or more programs, when executed by the one or more processors, cause the one or more processors to perform the method for operating a resistive random access memory according to claim 8; the electronic device is independent of the resistive random access memory, or the electronic device comprises the resistive random access memory.

* * * * *